(12) United States Patent
Smilansky et al.

(10) Patent No.: US 10,990,859 B2
(45) Date of Patent: Apr. 27, 2021

(54) METHOD AND SYSTEM TO ALLOW OBJECT DETECTION IN VISUAL IMAGES BY TRAINABLE CLASSIFIERS UTILIZING A COMPUTER-READABLE STORAGE MEDIUM AND PROCESSING UNIT

(71) Applicant: EMZA VISUAL SENSE LTD, Givatayim (IL)

(72) Inventors: Zeev Smilansky, Meishar (IL); Tal Hendel, Tel Aviv (IL); Tomer Kimhi, Tel Aviv (IL)

(73) Assignee: EMZA VISUAL SENSE LTD, Givatayim (IL)

( * ) Notice: Subject to any disclaimer, the term of this patent is extended or adjusted under 35 U.S.C. 154(b) by 121 days.

(21) Appl. No.: 16/255,868

(22) Filed: Jan. 24, 2019

(65) Prior Publication Data
US 2019/0228275 A1 Jul. 25, 2019

Related U.S. Application Data

(60) Provisional application No. 62/621,609, filed on Jan. 25, 2018.

(51) Int. Cl.
*G06K 9/00* (2006.01)
*G06K 9/68* (2006.01)
*G06K 9/62* (2006.01)
*G06K 9/32* (2006.01)

(52) U.S. Cl.
CPC ....... *G06K 9/6857* (2013.01); *G06K 9/00624* (2013.01); *G06K 9/3233* (2013.01); *G06K 9/6267* (2013.01)

(58) Field of Classification Search
None
See application file for complete search history.

(56) References Cited

U.S. PATENT DOCUMENTS

| 2004/0131231 A1* | 7/2004 | Smilansky | G06K 9/3241 382/103 |
| 2010/0289904 A1* | 11/2010 | Zhang | H04N 7/148 348/207.1 |

(Continued)

*Primary Examiner* — Vikkram Bali
(74) *Attorney, Agent, or Firm* — Soroker Agmon Nordman (57) ABSTRACT

The present invention discloses a method operable on a digital electronic device comprising constrained processing unit employing a limited computer-readable storage medium, also known as a digital memory, for allowing an object classification process to be executed on an image. The object classification process may be allowed by a processing unit interlocking with a digital memory unit, which receives an image representing a digital image captured by light incident on an image sensor, denoted herein as an original image. In some cases, a computerized process operable on the digital processing may identify a list of pixel arrays located at the original image, and thereby allow a classification process to be operated on these pixel arrays. In some cases, a process operable on the digital processing may grant access to another computerized process to perform the classification process. In some cases, such a computerized process may be operated by a computerized device designed to communicate with the digital electronic device, and/or the components thereof.

13 Claims, 7 Drawing Sheets

(56) References Cited

U.S. PATENT DOCUMENTS

2017/0231550 A1* 8/2017 Do ...................... G06K 9/4652
          382/128
2017/0353699 A1* 12/2017 Wang ................. H04N 5/23245
2018/0218519 A1* 8/2018 Almutiry .............. G06T 3/4061

* cited by examiner

METHOD AND SYSTEM TO ALLOW OBJECT DETECTION IN VISUAL IMAGES BY TRAINABLE CLASSIFIERS UTILIZING A COMPUTER-READABLE STORAGE MEDIUM AND PROCESSING UNIT

FIELD OF THE INVENTION

The present invention relates to digital devices utilized for interpreting dynamic scenes through visual analysis, and more particularly to digital devices designed to acquire and analyze images using an image sensor and a digital processor.

BACKGROUND OF THE INVENTION

As of today, small electronic detectors and imaging sensors performing scene interpretation, object detection and classification need to be integrated into larger systems that perform the computationally intensive parts of the analysis. The approach is to integrate sensors which identify motion in the detected area and trigger an image capturing device to send the original images further to an application or a system which can analyze the original images, and, based on the results of the analysis, perform tasks or create alerts in accordance with the application's requirements. Such tasks of the applications can comprise: people counting, people sensing, intruder detection, face detection, gesture recognition, distinction between people by age or gender, protection of identified population in a certain area, and the like.

In some cases, sensors are employed as triggers for capturing the images. These sensors can be passive infrared (PIR) sensors, microphones, microwaves, and others, as is well known in the art Such sensors may wake up a video camera that can capture an image or image sequence and send the images to a human reviewer or to an analysis module of the system. In such cases, the system is continuously required to be in operational mode, waiting for images to be received for the analysis process. In some cases, there is a need to maintain complex systems which can comprise computing units, communication means, UI, and other peripheral components. Such systems are often complex, costly, and consume considerable power.

SUMMARY OF THE INVENTION

The present invention discloses a method operable on a digital electronic device comprising constrained processing unit employing a limited computer-readable storage medium, also known as a digital memory, for allowing an object classification process to be executed on an image. The object classification process may be allowed by a processing unit interlocking with a digital memory unit, which receives an image representing a digital image captured by light incident on an image sensor, denoted herein as an original image. In some cases, a computerized process operable on the digital processing may identify a list of pixel arrays located at the original image, and thereby allow a classification process to be operated on these pixel arrays. In some cases, a process operable on the digital processing may gram access to another computerized process to perform the classification process. In some cases, such a computerized process may be operated by a computerized device designed to communicate with the digital electronic device, and/or the components thereof.

In possible embodiments of the present invention the digital electronic device comprises a processing unit coupled with a memory unit, designed to communicate with the computerized device, wherein said processing unit is also designed to receive an original digital image, and wherein the processing unit is configured with computerized instructions comprising instructions to store a received original image in the memory unit, and create a reduced resolution image out of the received original image. The digital electronic device may also utilize the processing unit to detect hot pixels on the reduced resolution image. The detected hot pixels on the reduced resolution image can undergo an analysis process to identify regions of interests. The digital electronic device may also be configured to convert coordinates of the identified regions of interest at the reduced resolution image to corresponding coordinates at the original image. The digital electronic device may also allow the computerized device to perform an object classification process for the digital image.

In some cases, the object classification process for the digital image can be allowed by the digital electronic device to be performed by a computerized device by using the reduced resolution image. In such cases, the digital electronic device may comprise the required instructions for the processing unit to allow the computerized device accessing to the memory unit. In some cases, the object classification process for the digital image can be allowed by the digital, electronic device to be performed by a computerized device by using the original image. In such, cases, the digital electronic device may comprise the required instructions for the processing unit to allow the computerized device accessing to the memory unit. In some cases, the digital electronic device, wherein the instructions to detect hot pixels on the reduced resolution image further comprises instructions to compare the pixels in the reduced resolution image with a threshold utilized to determine whether the pixel exceeded the threshold value. In some embodiments of the present invention, the threshold is numeric value predefined per pixel. Such a threshold value can be stored in a computer-readable medium. In some cases, such a computer-readable medium can be the memory unit coupled with the processing unit.

The processing unit of the digital electronic device can also be instructed to create a downsized, or reduced-resolution image of the original image, and subsequently identifies Regions of interest (denoted as ROIs) on said reduced-resolution image. In some cases, the ROIs may be identified as areas located on the reduced-resolution image which comprise at least a minimal number of pixels defined as hot pixels in said areas. In some cases, such pixels defined as hot pixels can be the result of a pixel by pixel comparison process which applies a background subtraction algorithm to the reduced-resolution image. For example, in some cases, pixels may be identified as hot pixels in case said pixels are detected as lighter or darker than some threshold values in the same location in the relevant image buffers. The processor unit may be configured to convert the ROI's identified on the reduced-resolution image to pixel arrays identified on the original image. In some cases, the process unit may also allow to perform scene analysis on pixel arrays identified on the original image. The scene analysis may comprise image analyzing processes such as motion analysis processes, pixel by pixel comparison, and the like. The motion analysis may comprise a motion detection, motion characteristics detection or any process involves processes or methods of detecting a change in the position of an object relative to the captured surroundings thereof. In some cases, the object classification may be performed by a different processing unit which may be granted with access permissions to the pixel arrays identified on the original image.

In some cases, the object classification may utilize processes comprising machine learning methods to learn identification of diverse types of objects. Such training often occurs offline, and the trained classifier is loaded into the constrained system. For example, in some cases, a object classification may be utilized to identify persons. In some cases, an object classification may be utilized to perform human gesture recognitions. In some cases, the object classification may comprise object counting, tracking and monitoring of objects represented in the original image, identification of features of human beings, or parts thereof such as heads, faces, upper bodies or full bodies, gesture recognition, and classification of people for example by age or gender. In some cases, object classification may be a process of identifying to which of a set of categories an observation belongs.

In some cases, the required resolution of the original image may be utilized to configure the digital memory available for the processing unit. In some cases, such a constrained processing unit may be characterized with clock rate of up to 100 megahertz and a digital memory, denoted herein as a memory unit, which may be between a 320 Kilo Bytes and one (1) Mega Bytes. The memory unit may be utilized by the processing unit for storing and receiving digital data. The memory unit may also comprise computer operable instructions which can be executed by the processing unit. In some cases, the memory unit may be embedded in the processing unit, for example, a cache or a working random-access memory (RAM). In other cases, the memory unit may be external to the processing unit, yet be accessible by the processing unit for read and write operations. In some embodiments of the present invention, the memory unit utilized by the processing unit may be combined from an embedded memory and an external memory accessible for read and write operations.

In possible embodiments of the present invention the resolution of the reduced-resolution image may be at a resolution suitable to be embedded in the space of the memory unit employed by the computing unit. For example, the reduced-resolution image can be stored in a memory unit of 320 kb at the resolution of QVGA which provides an array of 320×240 pixels and thereby to employs 80 Kilo Bytes of digital memory space for storing the original image.

In some embodiments of the present invention, the processing unit may receive the original image from an image sensor comprising a photosensitive cell array and designed to transduce optical image of objects formed on the photosensitive cell array by incidence of light, into corresponding electronic signals. For example, the processing unit may receive the original image from a CMOS sensor integrated with a camera. In some other cases, the processing unit may receive the original image from a computerized application, or a computer-readable storage medium designed to store digital files representing digital images. In some cases, the original image may be received from a dedicated element designed to capture digital images and then transfer the digital images further to a processing unit. For example, the original image may be received by the processing unit from an IR camera, or a bolometer.

In some cases, the processing unit may be a low power consumption processor designed to receive the original image, reduce the resolution and execute computer instructions required for the operational tasks. Such operational tasks may be, resolution reduction, pixel by pixel comparison, motion detection, classifying objects, and the like.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a method operable on a constrained processing unit employing a digital memory, for conducting scene analysis to allow an object classification process on a received image. The process of object classification on a received image can be adjusted according to the amount of digital memory available for the processing unit which performs the object classification process.

In some cases, the object classification may be performed by a different processing unit which may be granted with access permissions to the pixel, arrays identified on the original image. In some cases, the object classification may be performed by a different processing unit which may be granted with access permissions to the pixel arrays identified on the reduced resolution image. Thus, in some cases, the scene analysis performed by a different processing unit may be on the original image. In some cases, the scene analysis performed by a different processing unit may be on the reduced resolution image.

Figure 1A:
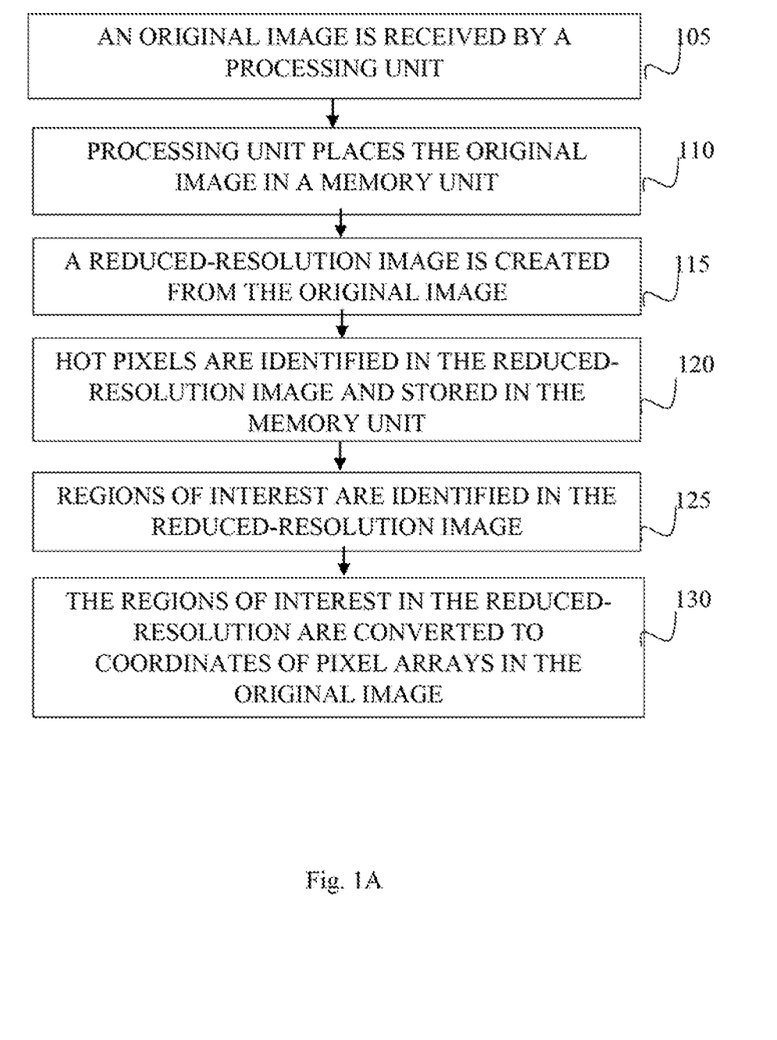
FIG. 1A designed to receive an original image and prepare pixel arrays for the scene analysis, according to exemplary embodiments of the present invention.

FIG. 1A discloses a method designed to receive an original image and prepare pixel arrays for the scene analysis, according to exemplary embodiments of the present invention. In step 105 an original image is received by a processing unit. In some cases, the original image may be a snapshot of a camera or, a video camera frame wherein a single image may be one still image of a complete moving picture.

In step 110 the processing unit places the original image in a memory unit comprising a memory buffer designed to store data representing images as aforementioned. For example, the memory unit may be able to store a bitmap representing an image. In step 115 the original image placed in the memory unit undergoes a process denoted herein as a Resolution Reduction Process, wherein a reduced-resolution image is created. In some cases, the reduced-resolution image may be placed in the digital memory according to the available digital memory of the processing unit. For example, in case the original image is in a VGA resolution providing a pixel array at the size of 640×480 pixels, the reduced-resolution image may be created at a resolution of QVGA, providing a pixel array in a size of 320×240. In some other exemplary cases, the resolution of the original image may be reduced to QQVGA resolution providing a pixel array in the size of 160×120 pixels. In some other cases, the VGA resolution of the original image may be reduced to QQQVGA, or to QQQQVGA in the reduced-resolution image, or in any other size or aspect ratio as required by the application and permitted by the memory. In some cases, the resolution reduction rate may be defined by a person having ordinary skills in the art, and which can consider other conditions in the processing unit. For example, the reduction of the resolution may be set according the following exemplary condition set:

In case original image is received in the resolution of 320×240 Pixels, also known as QVGA:
  (i) If the processing unit digital memory size is below 320 kilobytes, the reduced-resolution image may be created at a resolution of 160×120 Pixels, also known as QQVGA.
  (ii) If the processing unit digital memory size is at least 800 Kilobyte, there is no need for reduced resolution image.

In case original image is received at a resolution of 640×480 Pixels, also known as VGA:
  (i) If the processing unit digital memory size is between 320 Kilobytes and 800 Kilobytes, the reduced-resolution image may be created at a resolution of 160×120 Pixels also known as QQVGA.
  (ii) If the processing unit digital memory size is between 800 Kilobytes and 2000 Kilobytes, the reduced-resolution image may be created at a resolution of 320×240 Pixels, also known as QVGA.
  (iii) If the processing unit digital memory size is above 2000 Kilobytes, there is no need for reduced resolution image.
  (iv) In case original image is received at a resolution of 1000×1000 Pixels:
  a. If the processing unit digital memory size is above 2000 Kilobytes, the reduced-resolution image may be created at a resolution of 250×250 Pixels.

In some embodiments of the present invention, the resolution reduction process may utilize additional calculations and computerized processes. In some cases, the additional calculations and computerized processes may utilize additional parameters to conclude the required digital memory size and thereby to conclude the reduction rate of the original image. For example, a type of the object classification process, as elaborated below, may determine a memory capacity required to produce an object classification process in specific accuracy, or in some other cases, a specific resolution in order to utilize a specific object classification algorithm. In such cases, the digital memory size required for the object classification process may be considered in the process determine the resolution rate of the reduced-resolution image.

In some embodiments of the present invention the required resolution of the resolution reduction factor used for the reduced resolution image may be configured according to the digital memory available in the processing unit. Thus, if the hot pixel module requires three-byte size parameters for a pixel, the reduced resolution image can be at most 1/(1+3) or one quarter of the available memory, while if the hot pixel module requires only two byte size parameters for each pixel, the reduced resolution image can be at most (1/1+2) or one third of the available memory.

In step 120 the processing unit identifies hot pixels in the reduced-resolution image. In some cases, the processing unit may comprise a set of instructions which can be executed by the processing unit and thereby perform the hot pixel identification process. The pixels defined as hot pixels resulting from the comparison process herein may be individual pixels which are marked as hot pixels in the pixel by pixel comparison process, according to predefined criteria. For example, in some cases, pixels may be identified as hot pixels in case said pixels are detected as lighter or darker than other pixels compared to said pixels. In such an exemplary case, the other pixels compared with said pixels may be pixels at the same position on a previously received image. In some cases, the pixel comparison process may also utilize a threshold parameter to identify a pixel as a hot pixel. In some cases, the predefined criteria for the pixel comparison process may be specific color. For example, in case the color I the pixels are detected as different color or hue from the color or hue of other pixels.

The hot pixel identification process can utilize diverse pixel-by-pixel comparison methods, wherein an image can be compared with another image. In some cases, the pixel by pixel comparison method may utilize an upper and a lower threshold. In some cases, the pixel-by-pixel comparison method may utilize a modeling of pixel gray level profiles for example using a method known as a Mixture of Gaussians. In some cases, the pixel-by-pixel comparison method may utilize a previous image which can be stored in the memory unit beforehand. In some cases, the previous image may be an image previously received and stored by the processing unit. In some other cases, the previous image, or previous images, may be a predefined image stored in the memory unit. In some cases, upon completing the hot pixel identification process, the process unit may store the hot pixel map in the memory unit. In such cases, the hot pixel may be defined in a bitmap comprising bits representing the hot pixel.

In step 125 the identified hot pixels utilized to define one or more Regions of Interest (ROI) on the reduced-resolution image located at the memory unit. In some cases, the ROIs may be identified by the coordinates of pixel arrays at the reduced-resolution image. In such cases, the coordinates may represent areas comprising hot pixels on the reduced-resolution image. In some cases, a threshold may be utilized to identify a minimum number of pixels required to identify a pixel array as an ROI.

In step 130 the ROI coordinates identified in step 125 may be translated back to coordinates of pixel arrays in original image. For example, if the reduced resolution is QQVGA and the original image is VGA then the coordinate translation involves multiplying the coordinates of the reduced resolution ROI, e.g. the top, left, bottom and right by a factor of 4. In some cases, the translation back may be by converting the coordinates of the ROI's at the reduced-resolution image to the corresponding coordinates at the original image. For example, in case an ROI is identified in a specific pixel array at the reduced-resolution image, the coordinates of the specific pixel array at the reduced-resolution image may be converted to the corresponding coordinates of a specific pixel array in the original image. In some cases, the coordinates of a specific pixel array in the original image may be stored in the memory unit.

Figure 1B:
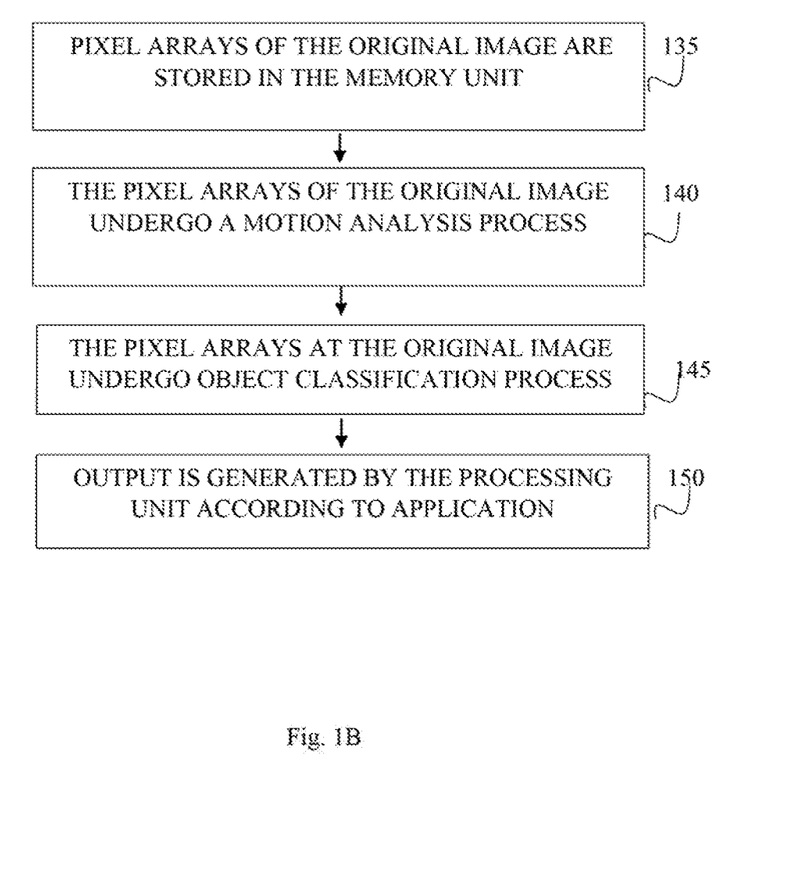
FIG. 1B discloses a method to perform a scene analysis on the original image, according to exemplary embodiments of the present invention.

FIG. 1B discloses a process of a scene analysis on the original image, according to exemplary embodiments of the present invention. In step 135 coordinates of specific pixel arrays in the original image may be stored in the memory unit. In some cases, the coordinates of the specific pixel arrays may be accessible by a processor, or a processing unit. In step 140 the pixel arrays of the original image may undergo motion analysis as explained below. For example, the motion analysis may be conducted and performed by a processor which has been granted access to the memory unit. In some case, the processing unit may grant the permissions required for a processor to conduct the motion analysis. In step 145 the pixel arrays of the original image may undergo object classification, a process which may be conducted and performed by a processor which may be granted access to the memory unit. In some case, the processing unit may grant the permissions required for the processor to conduct the of the object classification process. In some cases, an object detection may follow the object classification process.

In step 150 a processor which has been granted with access permission to the memory unit may determine the required output of the scene analysis. In some cases, such an output may comprise: The number of areas classified as having hot pixels, the positions and sizes thereof, the motion profile of the specific areas with hot pixels identified in the original image, results of the pixel-by-pixel comparison, the results of the motion characteristics detection, the object classification results such as how many people were observed, how many faces, gestures observed, and the like. The classification process is performed on ROIs translated from the ROIS on the reduced image that were identified as described above. In some cases, the output may be prepared in accordance with the computerized application requiring the output. For example, the application may be requiring that the output may be a counting of the number of people in a room, or a display device designed to display the image of the detected faces. In some other case, the application requiring the output may be a database, an application analyzing the output, and the like.

Figure 2:
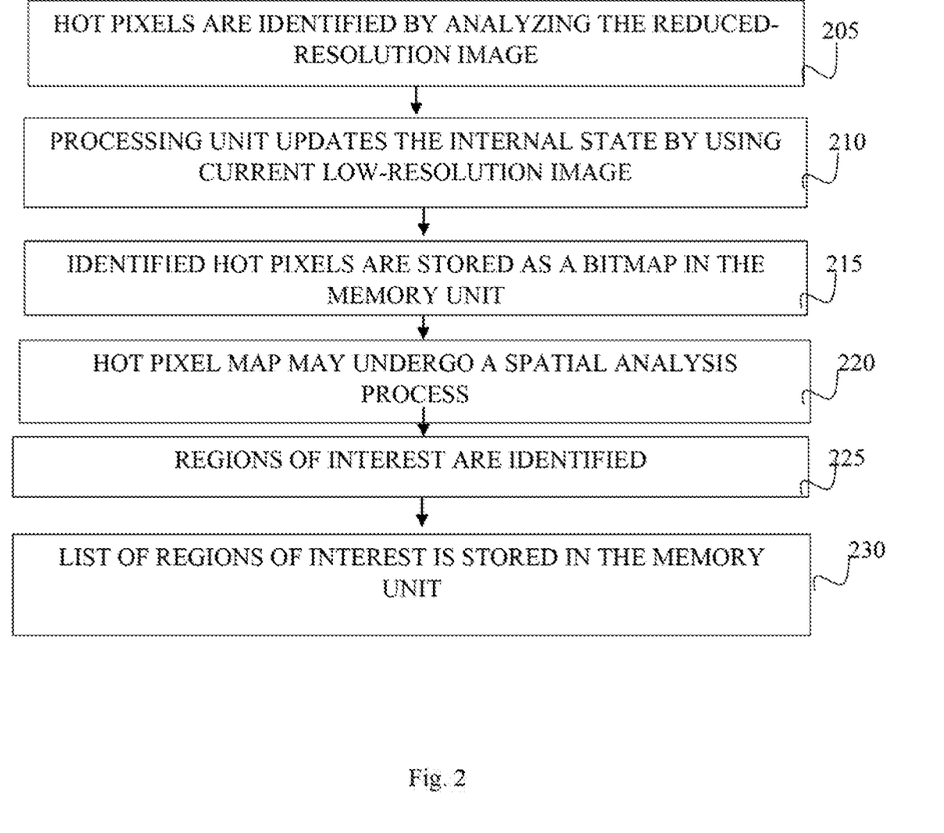
FIG. 2 discloses a method for identifying a region of interest in the reduced-resolution image, according to exemplary embodiments of the present invention.

FIG. 2 discloses a method for identifying a region of interest in the reduced-resolution image, according to exemplary embodiments of the present invention. In step 205 the processing unit performs hot pixel identification process on the reduced-resolution image stored in a memory unit. In some embodiments of the present invention, diverse methods of pixel-by-pixel comparison may be utilized, in accordance with the characteristics of the application and of the processing units. In some cases, such a method may be based on comparing the pixels of the newly reduced-resolution image, with pixels of a previously acquired reduced-resolution image, wherein a threshold may be utilized in the pixel-by-pixel comparison process. Such a threshold can be a fixed threshold, or an adaptive threshold such as a threshold that changes according to place or time and, and the like. In such exemplary cases, if the difference between some pixels chosen from a pixel array on the newly reduced-resolution image and some pixels chosen at same location on a pixel array taken from a previous reduced-resolution image, is higher than a threshold, the pixel on the newly some pixels chosen may be marked as a hot pixel. In some other cases, alternative pixel-by-pixel comparison methods may be utilized.

In some cases, the pixel-by-pixel comparison method may comprise a Low/high threshold, wherein low and high thresholds can be numeric values utilized to determine if one of the thresholds was exceeded. In some other cases, the pixel-by-pixel comparison method may comprise a background subtraction process utilizing a Gaussian mixture model, wherein the pixel models are presented by 2 or more parameters. In some other cases, the pixel-by-pixel comparison methods utilized to identify hot pixels may be other methods known to persons having ordinary skills in the art.

In step 210 the processing unit may update the state of the hot pixel analysis module stored in a memory unit. Thus, the processing unit may store the current reduced resolution image over the previously stored reduced resolution image in preparation for analyzing the hot pixels of the next frame. In other cases, the two threshold parameters are updated and stored. In other cases, the parameters of the Gaussians are updated and stored.

In step 215 the identified hot pixels associated with the reduced-resolution image may be stored as a bitmap in the memory unit. In some cases, the hot pixel map can be noisy in particular under low light or outdoors conditions. Thus, the hot pixel map can be cleaned by well-known methods such as erosion and dilation. This is followed by a labeling process yielding a map of labeled areas, or ROIs, associated with areas with hot pixels.

In step 220 the hot pixel map may undergo a process of spatial analysis. The spatial analysis identifies connected components of hot pixels through an algorithm of connected component analysis as is well known in the art, and determines some of the features of such components, such as bounding box coordinates, number of hot pixels and, and the like. In some cases, a process of erosion and dilation may be integrated into the spatial analysis to probe pixels which were marked as hot pixels In step 225 the processing unit yields a list of ROIs with hot pixels, wherein the ROIs are defined as rectangular pixel arrays of the reduced image containing hot pixels within them. Such a rectangular array may comprise at least one pixel in one row and at least one pixel in one column. In some cases, the ROIs may include unique identifiers associated with a defined block of hot pixels. In some embodiments of the present invention, the ROIs may define a block of pixels in the reduced image, wherein said blocks comprise a minimal number of hot pixels. In yet another embodiment of the present invention, a threshold for the number of hot pixels may be utilized and the process unit may label arrays of pixels in the original image, wherein said arrays of pixels may comprise a number of hot pixels which exceeds the threshold. Such labeled arrays can be identified as ROIs. In step 230 the process unit stores the map with the areas with hot pixels in the memory unit. In some cases, the process defined in step 230 may be configured to store the ROIs in the memory unit. In some cases, said process defined in step 230 may be configured to store only the ROIs in the memory unit. In such cases, the rectangular pixel arrays of the reduced image which are not defined as ROIs may not be saved in the memory unit.

Figure 3:
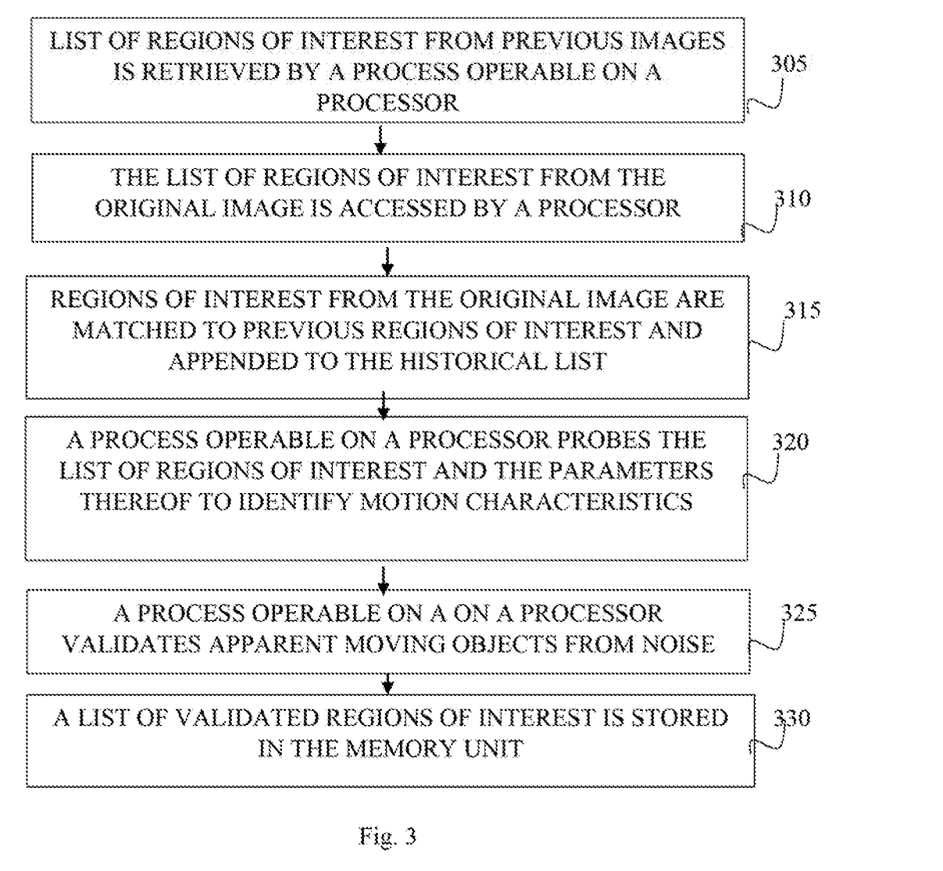
FIG. 3 describes a method of preforming motion analysis on a list ROIs of the original image, according to exemplary embodiments of the present invention.

FIG. 3 describes the method of preforming motion analysis on a list of ROIs on the original image, according to exemplary embodiments of the present invention. In step 305 the previously prepared list of classified ROIs of the original image associated with previous frames may be retrieved by the processing unit.

In step 310 the ROIs determined from a hot pixel map stored in the memory unit and the labels thereof can be accessed by a computerized method. In some cases, classification data labels may be also associated with said pixel arrays of the original image.

In step 315 the pixel arrays of the original image are compared with historical data of the object which comprises the list of previously identified pixel arrays of the original image. In some cases, the processor may access a dedicated computer-readable medium which may comprise historical data on previous images of the same captured area. Thus, in some cases, the dedicated computer-readable medium can comprise ROIs of the original image, and the like, of images taken in the past. In such cases, the ROIs can be tracked by methods which tracks historical positions and sizes, motion profiles, and the like, in order to and filter out reasonable ROIs of the original image from noise according to size, width, height, position, history, and motion profiles. Such standard pixel arrays tracking, methods may be methods which are known to a person having ordinary skills in the art.

In step 320 a process operable on a processor may probe the ROIs and the parameters thereof to identify the motions of ROIs. In such cases, probing the ROIs may detect a probability and/or a motion profile of said object. For example, the process operable on the processing unit may detect ROIs which may be moving smoothly from one point to the other while retaining similar features such as width, height and number of hot pixels, and distinguish them from ROIs which move randomly and their features change abruptly, such ROIs may be the result of illumination changes, pieces of cloth waving in the wind, plant branches etc. In some cases, the original image and the ROI list associated thereof may be compared with a previous image and a ROI list stored in the memory unit beforehand. In such cases, ROIs of the original image may be identified by the labels and compared with ROIs of previous images. In some cases, a threshold may be utilized to identify a minimum number of pixels required by the process executed on the processing unit to indicate significant motion. In some cases, the comparison between the ROIs may yield a motion vector for the ROIs. In some other cases, the ROIs of the original image may be compared with other previous images. In such cases, a process for reserving previous images and store in the memory unit may take place.

In step 325 the ROIs which were classified as moving objects may undergo further analysis process. Such ROIs are denoted as validated ROIs. In some cases, in further analysis processes, the motion vector associated with an object may be compared with acceptable motion profiles as described above. In some cases, the further analysis process may change the classification of the moving objects as a result of the thither analysis. For example, in case the motion vector of a certain ROI comprises more changes and divergences than a predefined measure, said certain ROI may not classify as a valid target. In some cases, the further analysis process may comprise additional analysis processes such as color information detection, target tracking, and the like. For example, the further analysis process may track a classified target in cases wherein the classified target is static, for example as a person that sits relatively motionless. In some cases, after the further analysis process, the ROIs remained in the memory unit, are the validated ROIs.

In some cases, upon the completion of the further analysis process the data on the validated ROIS may be stored in a database. In some embodiments of the present invention, such a database may be connected and communicating with the processing unit. In possible embodiments of the present invention, such a database may be located in the memory unit. In step 330 a process operable on the processing unit may list the validated ROIs and store said list of validated ROIs in the memory unit. In some cases, the list of validated ROIs may be stored in a database.

Figure 4:
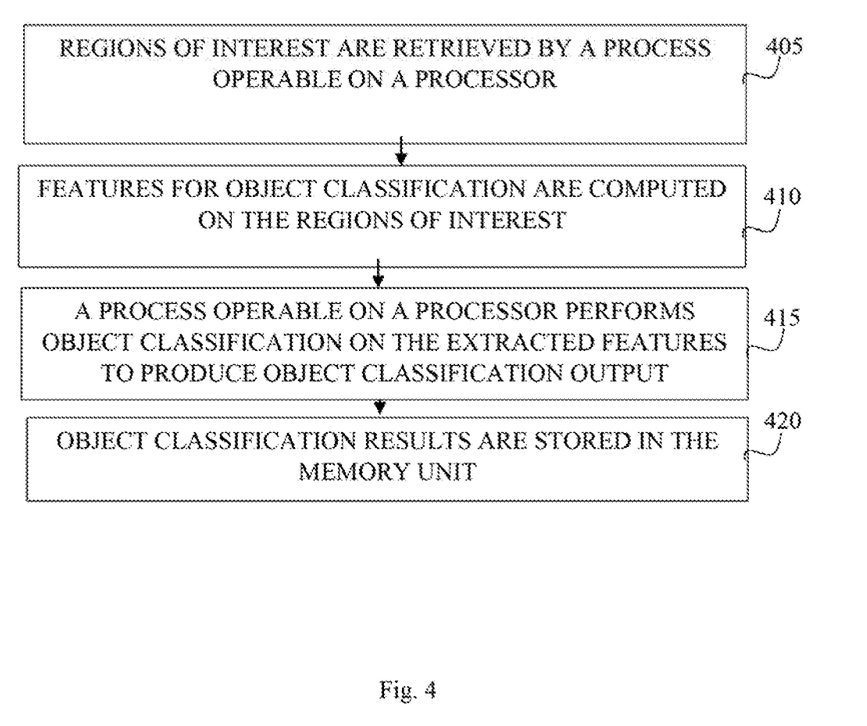
FIG. 4 describes an object classification method which can be utilized for specific ROIs of the original image, according to exemplary embodiments of the present invention.

FIG. 4 describes an object classification method which can be utilized for specific ROIs of the original image, according to exemplary embodiments of the present invention. Thus, in step 405 the list of the ROIs associated with the original image and the labels thereof may be detected and accessed by the computerized process operable on the processing unit. In step 410 a process operable on the processing unit may extract features of the ROI. Such features are well known in the art such as HAAR features, Histogram of Gradients (HoG) features, channel features, color features (in case of a color image) and, and the like. In some other cases, the features may also comprise SIFT (Scale Invariant Feature Transform) based descriptors. In some other cases, a method of texture-based classification may be added to the classification process. In step 415 an object classification process may be performed by the process operable on the processing unit. The object classification process may classify the detected ROIs which in some cases, may be associated with labels as aforementioned, to previously learned object classes such as full bodies of people, upper bodies, heads, faces and, and the like. The operations associated with, or driven by the object classification methods may not require utilization of floating-point calculations.

In some embodiments of the present invention, the object classification process may be a process of a sequence of decision trees. In another embodiment a Support Vector Machine (SVM) is used. In another embodiment rejection cascade is used. In another embodiment a feed-forward network is used.

In some embodiments of the present invention, a database comprising historical information may also comprise diverse data structures and algorithms which can function on the data structures. For example, the database may comprise an artificial neural network which can receive one or more inputs and sum them to produce an output. In some cases, machine learning models which can perform object classification with the ability to learn without being explicitly programmed, may be implemented in the database structure. Thus, a device embodying the method disclosed in the present invention can implement object classification methods in diverse fields. For example, a device embodying the method disclosed in the present invention can be utilized for people counting wherein the object classification may be trained to detect people. Said device may also be utilized to detect people carrying weapons, wherein the object classification may be trained to detect diverse types of weapons.

In step 420 the results of the classification process are stored in the memory unit ready to be utilized for transmission or further analysis according to application.

Figure 5:
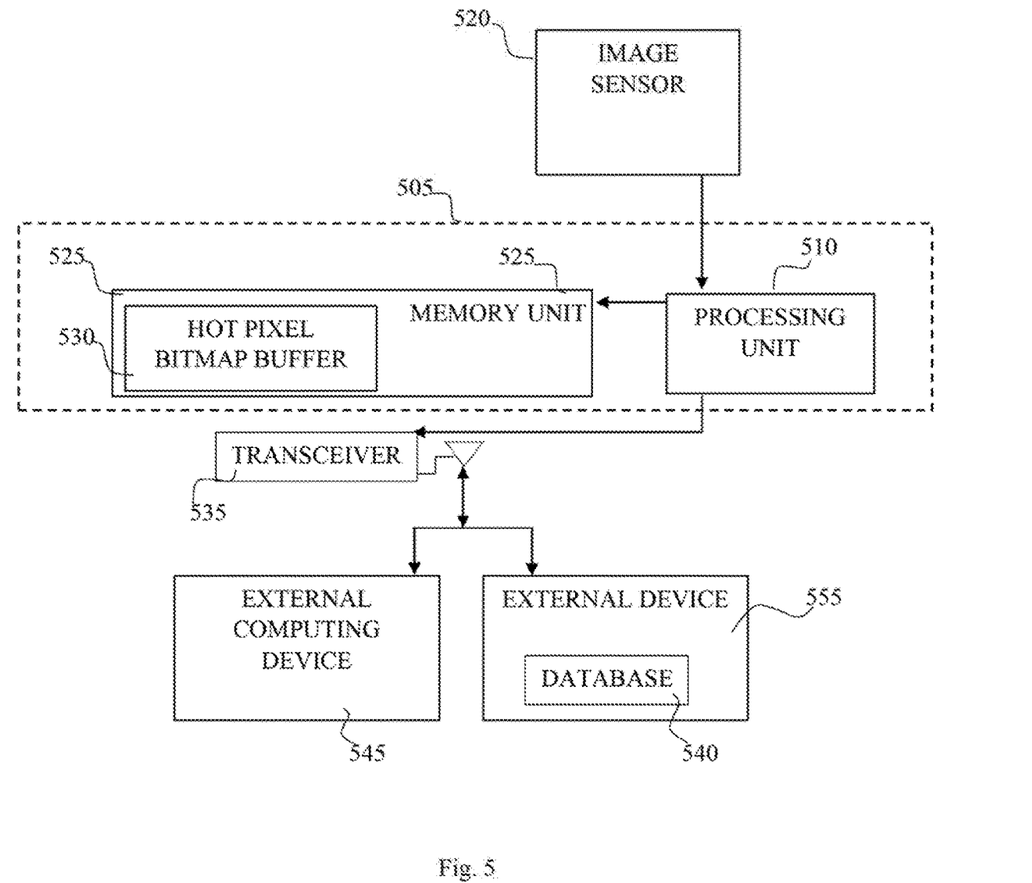
FIG. 5 shows a processing unit connected to a memory unit designed to receive an image and conduct a scene analysis, according to exemplary embodiments of the present invention.

FIG. 5 shows an architecture of digital electronic devices comprising a processing unit connected to a memory unit, designed to receive an image and conduct scene analysis, according to exemplary embodiments of the present invention. FIG. 5 shows an architecture of digital electronic devices denoted as architecture 505. Architecture 505 comprises a processing unit 510 coupled with a memory unit 525, wherein the processing unit 510 is designed to receive an original image and conduct a scene analysis thereon. In some cases, such a receiving may be sending a memory address to the processing unit 510, wherein the memory address comprises the original image stored in a memory unit 525 of the architecture 505. In some cases, the original image may be provided by an image capturing device designed to capture digital images. In some other cases, the original image may be provided from an image sensor such as image sensor 520 which may be designed to capture incidents of light provided by a camera or a digital video camera. In some cases, the image sensor 520 may comprise a photo sensitive element comprising a plurality of photosensitive units covered on a surface of a transducer The processing unit 510 may also be configured to execute computer instructions required for the scene analysis of the original image. In some cases, the computer instructions may also comprise, executing computer algorithms to perform image processing on digital images, accessing the image sensor 520, converting the electrical signals generated by the photosensitive units of the image sensor 520 to a digital information, reading data representing an image, and the like. In some cases, the processing unit 510 may comprise a List of computer instructions designed to perform the instructions required for the scene analysis.

The memory unit 525 is designed to be connected to the processing unit 510. In some cases, the memory unit 525 may comprise a physical storage for storing data digitally represented and machine codes required to execute the scene analysis. In some cases, the memory unit 525 may comprise data structures which can be utilized in the motion analysis method, the object classification methods, and the like. In some cases, information received from external databases may also be stored in memory unit 525. The memory unit 525 be configured with a hot pixel bitmap buffer 530 for storing the hot pixel bitmap and the ROIs thereof. Thus, the processing unit 510 may utilize the data stored in the memory unit 525 for executing the instructions of the scene analysis and. For example, instructions such as loading a bitmap of hot pixels to the bitmap buffer 530, storing the motion vector in the memory unit 525, storing ROIs in the memory unit 525, and the like, may be executed by the processing unit 510.

The processing unit 510 may also be connected to a transceiver 535 designed to transmit and a receive electrical signals. In some cases, the processing unit 510 may be connected to a receiver and a transmitter implemented in the place of transceiver 535. In some cases, the transceiver 535 may be configured to communicate with an external device 555 which employs a database 540. The external device 555 may be a computerized device such as a computer, a server, or any other device comprising computer-readable storage medium and a processor. In some cases, the database 540 may comprise data and information associated with the image received in the processing unit 510. Such data may be historical patterns of objects, classification data vectors associated with the areas with hot pixels, and the like. In some cases, the processing unit 510 may access the database 540, read data and load data to the memory unit 525. In some other cases the processing unit 510 may access the database 540, write data and copy data. Such a data may be color properties of ROIs, updating a motion vector, and the like. In some cases, the processing unit 510 may be instructed to allow the external device 555 to perform the classification process by using the database 540. In some cases, the object classification may be performed by the external device 555 by using the original image. In some cases, the object classification may be performed by the external device 555 by using the reduced resolution image.

Figure 6:
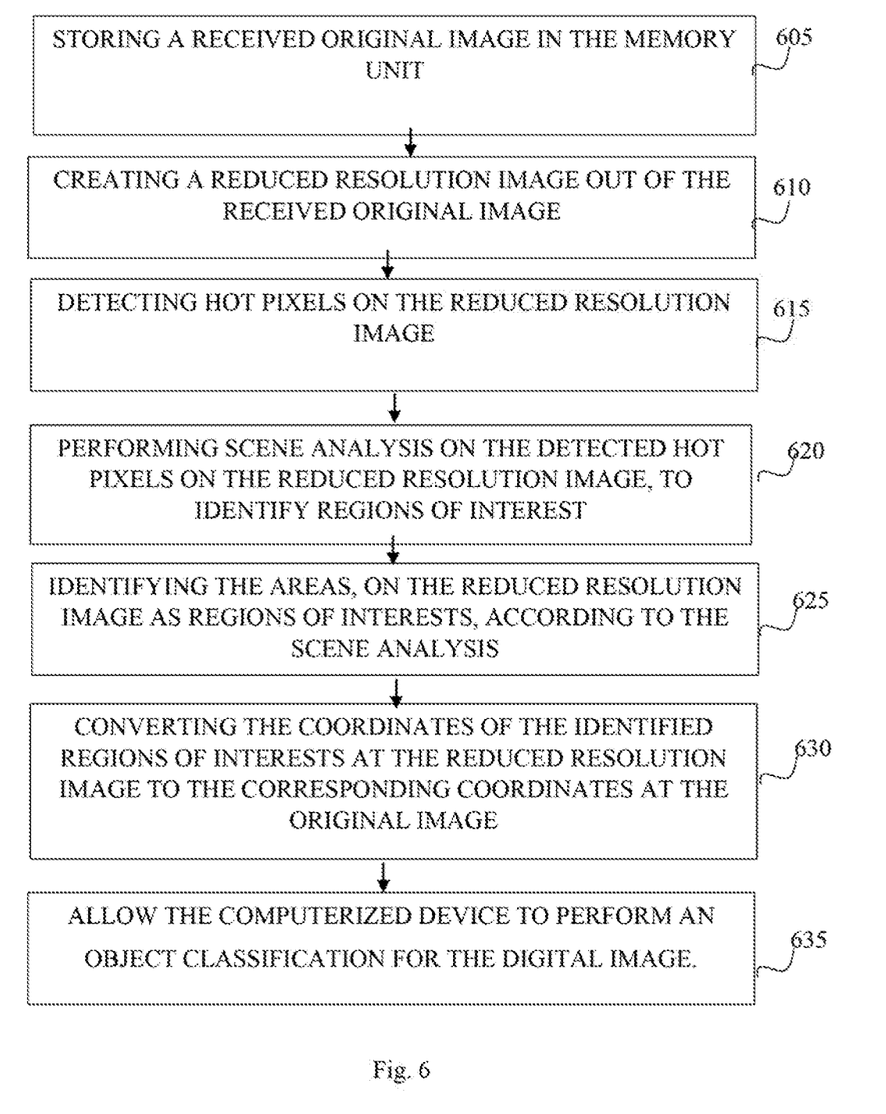
FIG. 6 discloses a method operable on a digital electronic device comprising a processing unit coupled with a memory unit, for preforming a scene analysis on a digital image.

FIG. 6 discloses a method operable on a digital electronic device comprising a processing unit coupled with a memory unit, for preforming a scene analysis on a digital image. At step 605 a digital electronic device comprising a computing unit stores a received original image in a memory unit. At step 610 the digital electronic device may create a reduced resolution image out of the received original image. In some cases, such a reduced resolution image may be stored in a memory unit coupled with the computing unit. At step 615 the digital electronic device detects hot pixels on the reduced resolution image, as aforementioned. At step 620 the digital electronic device performs a scene analysis on the detected hot pixels on the reduced resolution image. Such a scene analysis can comprise image analyzing processes such as motion analysis processes, object classification processes, and the like.

At step 625 the digital electronic device identifies areas on the reduced resolution image, as regions of interests. At step 630 the digital electronic device converts coordinates of the identified regions of interest at the reduced resolution image to corresponding coordinates at the original image. At step 635 the digital electronic device allows a computerized device to perform an object classification process for the digital image in accordance with the coordinates of the regions of interest. In some cases, the digital electronic device may utilize the reduced resolution image to corresponding coordinates to allow a computerized device to perform the object classification process original image. Thus, in some cases, such an allowance may be provided by sending the corresponding reduced resolution image coordinates to an external device. For example, the external device can be computerized device communicating over the network. In such exemplary case, the external device may communicate with the digital electronic device and provide the coordinates of the hot region to the external device.

In some cases, wherein the external device receives the coordinates of the hot region, the external device may initiate a scene analysis, according to the received coordinates. In some cases, such a scene analysis may be performed on the original image. In some other cases, such a scene analysis may be performed on the reduced resolution image. Thus, the reduced resolution image and/or the original image may reside in a location at a memory unit configured to be accessed by such external devices. For example, the reduced resolution image and/or the original image which undergo scene analysis may be configured such that, an external device may access via a telecommunication network, receive access to the specific memory address of the memory location in which the reduced resolution image and/or the original image reside. In such an exemplary case, the external device may utilize a memory address for conducting the scene analysis. The external device conducting the scene analysis can be such as external device shown at FIG. 5.

In some cases, the coordinates of the identified regions of interest at the reduced resolution image may be utilized for the object classification process at the original image. In some cases, the coordinates of the identified regions of interest at the reduced resolution image may be utilized for the object classification process at the reduced resolution image.

In some embodiments of the present invention, the object classification process may be coupled with a detecting and alerting process. The detecting and alerting may comprise identifying specific objects identified in the object classification process and alert accordingly. Such an alert can be sending a message such as a text message to any electronic mobile device, sending a text message via an electronic mail, operating an alerting system, and/or emergency communication system configured to send emergency notification. In some cases, the alerting may be dependent on the detecting. For example, in case an object is identified by object classification process to be in a specific category, the alerting may send a message, or operating an emergency notification. In some cases, the detecting and alerting process may comprise a preconfigured condition set which instruct alerting of the detecting and alerting process. For example, in case the identified object is classified as a human, the detecting and alerting process may send a message to a specific person, according to a predefined rule set. Such a rule set may comprise the definition of the alerting according to the category of the classified object.

While the disclosure has been described with reference to exemplary embodiments, it will be understood by those skilled in the art that various changes may be made and equivalents may be substituted for dements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A digital electronic device, comprising:
a processing unit coupled with a memory unit, designed to communicate with a computerized device, wherein said processing unit is also designed to receive an original digital image showing a scene, and wherein the processing unit is configured with computerized instructions comprising instructions to:
(i) create a reduced resolution image out of the received original digital image;
compare the pixels in the reduced resolution image with historic data extracted from pixels of one or more previously acquired reduced-resolution images showing the scene;
detect hot pixels on the reduced resolution image based on said comparing;
perform scene analysis on the detected hot pixels on the reduced resolution image, to identify regions of interests;
(ii) identify coordinates of the regions of interest at the reduced resolution image;
convert the coordinates of the regions of interest at the reduced resolution image to corresponding coordinates of the original digital image;
allow the computerized device to perform an object classification process for the digital image, in accordance with the coordinates of the regions of interest.

2. The digital electronic device of claim 1, further comprising instructions to perform an object detection process on the hot pixels identified from the digital image.

3. The digital electronic device of claim 1, wherein the instructions to detect hot pixels on the reduced resolution image further comprises instructions to compare the pixels in the reduced resolution image with one or more per-pixel thresholds utilized to determine whether the pixel exceeded the threshold value.

4. The digital electronic device of claim 1, wherein the processing unit comprises a memory at the size of up to one (1) Mega Bytes.

5. The digital electronic device of claim 1, wherein memory unit comprises a digital memory at the size of up to 5 Mega Bytes.

6. The digital electronic device of claim 1, wherein the scene analysis is configured to operate a motion detection process, to identify regions with hot pixels.

7. The digital electronic device of claim 1, wherein the identified ROIs is further configured to execute a further analysis process yielding a list of validated ROIs stored in the memory unit.

8. A method operable on a digital electronic device designed to communicate with a computerized device, wherein the digital electronic device comprises a processing unit coupled with a memory unit, comprising:
receiving an original digital image showing a scene;
(i) creating a reduced resolution image out of the received original digital image;
comparing the pixels in the reduced resolution image with historic data extracted from pixels of one or more previously acquired reduced-resolution images showing the scene;
detecting hot pixels on the reduced resolution image based on said comparing;
performing scene analysis on the detected hot pixels on the reduced resolution image, to identify regions of interests;
(ii) converting coordinates of the regions of interest at the reduced resolution image;
convert the coordinates of the regions of interest at the reduced resolution image to the corresponding coordinates at the original digital image;
allowing the computerized device to perform an object classification process for the digital image, in accordance with the coordinates of the regions of interest.

9. The method of claim 8, wherein a region of interest is identified as a region of interest in case the number of hot pixels in said region of interest is larger than zero.

10. The method of claim 8, wherein a region of interest is identified as region of interest in case the number of hot pixels in said region of interest is larger than a predefined threshold.

11. The method of claim 8, further comprising performing an object detection process on the hot pixels identified from the digital image.

12. The method of claim 8, wherein detecting hot pixels on the reduced resolution image further comprises compression of the pixels in the reduced resolution image with a threshold utilized to determine whether the pixel exceeded the threshold value.

13. The method of claim 8, wherein the identified ROIs comprises a further analysis process yielding a list of validated ROIs stored in the memory unit.

* * * * *